United States Patent [19]

Kjaer

[11] Patent Number: 5,441,074
[45] Date of Patent: Aug. 15, 1995

[54] UNITIZED HYDRANT VALVE ASSEMBLY

[75] Inventor: Niels A. Kjaer, Laasby, Denmark

[73] Assignee: AVK-Holding, Galten, Denmark

[21] Appl. No.: 321,758

[22] Filed: Oct. 12, 1994

Related U.S. Application Data

[63] Continuation-in-part of Ser. No. 196,502, Feb. 15, 1994, Pat. No. 5,368,064.

[51] Int. Cl.⁶ .............................................. F16L 7/00
[52] U.S. Cl. ................................. 137/375; 137/283; 137/316; 251/291
[58] Field of Search .................. 137/375, 283, 316; 251/356, 291

[56] References Cited

U.S. PATENT DOCUMENTS

| | | |
|---|---|---|
| 1,352,735 | 9/1920 | Egerton . |
| 2,202,735 | 5/1940 | Johnson . |
| 2,469,109 | 5/1949 | Goecke . |
| 2,980,125 | 4/1961 | Grant et al. . |
| 3,074,424 | 1/1963 | Pletcher et al. ..................... 137/316 |
| 3,267,952 | 8/1966 | Pletcher et al. ..................... 137/316 |
| 3,310,277 | 3/1967 | Nielsen et al. . |
| 4,073,307 | 2/1978 | Royce . |
| 4,227,544 | 10/1980 | Luckenbill . |
| 4,303,223 | 12/1981 | Whisenhunt et al. . |
| 4,790,341 | 12/1988 | Laurel . |
| 4,842,246 | 6/1989 | Floren et al. . |

FOREIGN PATENT DOCUMENTS

| | | |
|---|---|---|
| 0092482 | 10/1983 | European Pat. Off. . |
| 1650558 | 9/1977 | Germany . |
| 2204100 | 11/1988 | United Kingdom ................ 251/291 |

*Primary Examiner*—A. Michael Chambers
*Attorney, Agent, or Firm*—Richard C. Litman

[57] ABSTRACT

A unitized, rubber coated valve body for a dry barrel fire hydrant. The valve body is formed to have a hollow, tapered, substantially spherical, cast iron member having a hollow center, a threaded, upwardly facing hole for attachment to a control shaft or stem, a downwardly facing projection, and a rubber coating. The unitized body eliminates labor of assembly during service and maintenance operations. The rubber coating both provides a resilient valve face for effective sealing, and protects metal parts of the valve from corrosion arising from contact with water. The tapered body both distributes force evenly to the rubber valve face in the manner of a prior art metal disc, and enables water to flow therearound with minimized resistance, thereby maintaining head pressure at acceptable levels. The novel valve body satisfies both objectives while minimizing weight and requiring minimal material for fabrication. The body is formed with integral ears for slidably obstructing drain holes. One or more of the ears has a stop pin mounted therethrough for preventing the passage of the valve body through the hydrant valve seat ring during reassembly after a field repair or maintenance operation.

6 Claims, 4 Drawing Sheets

UNITIZED HYDRANT VALVE ASSEMBLY

CROSS REFERENCE TO RELATED APPLICATION

This application is a continuation-in-part of application Ser. No. 08/196,502, filed Feb. 15, 1994 now U.S. Pat. No. 5,368,064 issued Nov. 29, 1994.

BACKGROUND OF THE INVENTION

1. Field of the Invention

The present invention relates to a valve disc assembly, or valve body, for a dry barrel fire hydrant, and more specifically, to an improved valve body retention arrangement, particularly useful during field repair of the hydrant.

2. Description of the Prior Art

Improvements to water valves generally and more specifically to those for fire hydrants has inspired numerous prior art patents. Two major developments over the years have included resilient valve faces, as provided by employing rubber, and drain holes which are obstructed and revealed by the valve member. The latter feature is an improvement to the dry barrel hydrant, which was developed to combat freeze damage to hydrants in northern climes. Little has been done, however, to facilitate the repair of the hydrant valve assembly in the field.

The following references are exemplary of the art. U.S. Pat. Nos. 4,073,307, issued to John H. Royce on Feb. 14, 1978; 4,303,223, issued to Fred S. Whisenhunt on Dec. 1, 1981; 4,790,341, issued to David F. Laurel on Dec. 13, 1981; and 4,842,246, issued to Carl E. Floren et al. on Jun. 27, 1989, each disclose a valve for a fire hydrant having a rubber valve face and also having ears which, when the valve is open for operation, block drain holes. Whisenhunt '223 is also illustrative of those designs providing walls surrounding the ears formed with a valve body, the walls constraining the valve body to move only axially when the stem is rotated, and against rotation responsive to this rotation. In each of these cases, the rubber valve seat is formed on a rubber disc sandwiched between upper and lower metal retaining members. Furthermore, no structure is provided for preventing unintended disassembly of valve parts during maintenance repair work in the field.

U.S. Pat. No. 1,352,735, issued to Henry C. Egerton on Sep. 14, 1920, discloses a valve having a metal disc entirely encased in a material such as rubber. Encasement in rubber protects metal parts from deterioration from contact with water.

U.S. Pat. No. 4,227,544, issued to Lawrence F. Luckenbill on Oct. 14, 1980, discusses head losses during high flow as a consequence of the configuration of the water passageway. The valve body is provided with frustoconical portions to assist in reducing turbulence and head pressure losses. U.S. standards for fire hydrants now include limits on head losses.

Rubber encasement of the valve body is seen, in combination with a valve body designed to be streamlined for reduced resistance to liquid flow, in U.S. Pat. No. 3,310,277, issued to Helmar T. Nielsen et al. on Mar. 21, 1967, and European Patent Office Application No. 0,092,482, dated Oct. 26, 1983.

The devices of Egerton '735, Nielsen et al. '227, and EPO reference '482 are not directed to hydrant valves, and the respective valve bodies, when opening, move in the same direction as water flow, and are not hollow. This is in contrast to the practice of hydrant valves, wherein, at least in most recent designs, the valve opens against the direction of water flow.

A still more streamlined valve body is shown in U.S. Pat. No. 2,980,125, issued to Allen F. Grant et al. on Apr. 18, 1961. The streamlined body is made in mating halves, the valve being hollow and accessible, so as to house cooperating ears (elements 70) and legs (elements 75). This arrangement prevents the valve body from rotating, the valve body thus being constrained to move only axially, vertically, in response to rotation of the control shaft assembly operated by rotation of upper wrench lug (element 167).

Other prior art patents of interest include U.S. Pat. No. 2,202,735, issued May 28, 1940 to John S. Johnson, which teaches the coating of a reciprocating valve with a resilient material (e.g., vulcanized rubber) and U.S. Pat. No. 2,469,109, issued May 3, 1949 to Rudilfe F. Goecke, disclosing a reciprocating valve body covered with a corrosion resistant material (e.g., glass enamel). German Patent No. 16 05 558 to E. Schnabel and dated Sep. 8, 1977 shows a valve body coated with a plastic material (e.g., polytetrafluoroethylene).

None of the above inventions and patents, taken either singly or in combination, is seen to describe the instant invention as claimed.

SUMMARY OF THE INVENTION

The present invention discloses a valve disc or body for use with a dry barrel hydrant. The improvements thereto result in a single piece valve body, fully encased in rubber. The former characteristic reduces labor of assembly and disassembly required during periodic maintenance and service. The latter characteristic reduces service requirements by protecting metal parts from deleterious contact with water. Furthermore, the instant invention provides a cooperative stop structure for preventing the hydrant main valve from sliding down and out of the valve seat ring within the hydrant when the hydrant interior components are being reassembled after removal for maintenance and/or repair and replacement of parts in the field.

A particular combination of characteristics is set forth in the present invention which allows all the benefits to be realized, while rendering the final valve assembly as practical and economical as possible. It is desired to provide a single piece rigid base member which distributes force evenly against the rubber valve seat, thus assuring positive valve closure and minimizing stresses which would abrade or wrinkle the seat, and which defines a streamlined shape, thus causing efficient water flow patterns around the valve body when the valve is open.

To accomplish both objectives simultaneously requires a valve body which is essentially a tapered sphere, rather than a pure disc, which would distribute forces, but would not promote smooth water flow.

It then becomes important to limit the mass of the valve body, to reduce weight of both individual components of and the whole hydrant, which eases handling and servicing thereof, and to save cost.

The novel valve body satisfies these requirements by being constructed of a hollow, tapered, generally spherical or frustoconical, rigid member having a rubber coating. This valve body is operated by the conventional rotated stem or shaft, and is constrained against rotation by partially surrounding conventional ears to ride in tracks or grooves. The ears obstruct conventional drain holes when the valve is opened, and permit draining when the valve is closed.

Also, a stop pin is inserted into and through one or more of the conventional ears so that, upon reinsertion of the main valve body back into the hydrant after removal for replacement or repair in the field, the body is prevented from slipping past its valve seat ring. The pin is made of a corrosion resistant material, preferably, and is inserted into and through a hole formed through the valve body ear which is lined with the same resilient material covering the main valve body. In this way, the corrosion resistant characteristics of the valve body are maintained and, given the elastic nature of the coating and with proper dimensioning of the hole and pin, the stop pin may simply be press fit through the hole to assemble the pin with the ear.

Accordingly, it is a principal object of the invention to provide a hydrant valve disc assembly of unitary construction, which is further provided with a stop construction which prevents unintended passage of the valve body through and out of its valve seat ring during reassembly of parts after the removal of the same for replacement and/or repair in the field as a part of a maintenance operation.

It is another object of the invention to provide a hydrant valve disc assembly having a single piece rigid base member.

It is a further object of the invention to provide a hydrant valve disc assembly which is encapsulated in rubber.

Still another object of the invention is to provide a hydrant valve disc assembly of minimal weight, and using minimal material.

Yet another object of the invention is to provide a hydrant valve disc assembly which reduces resistance to water flow therepast, and limits' head losses at high rates of flow therethrough.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
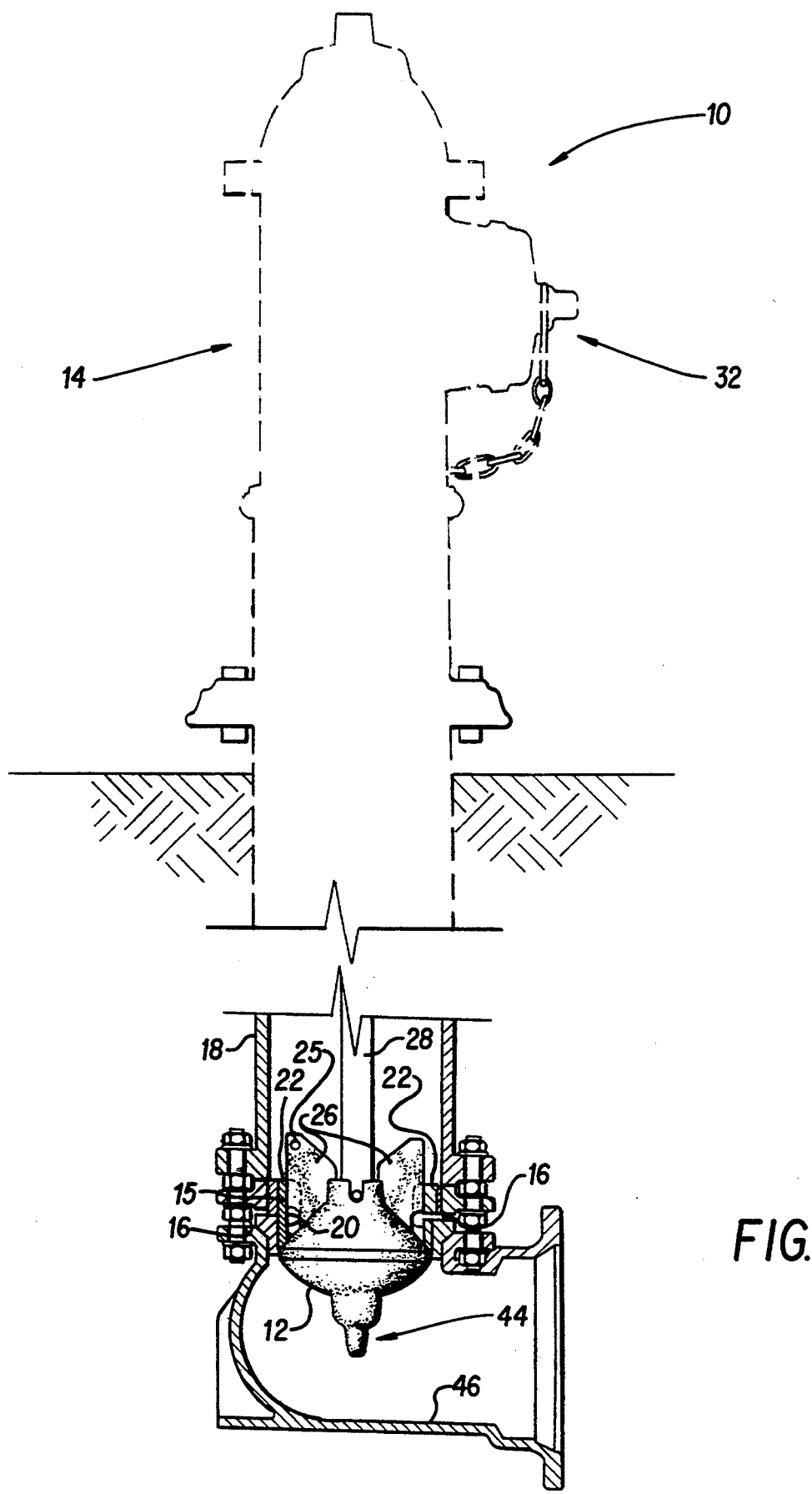
FIG. 1 is a partially diagrammatic, environmental, side elevational, partly cross sectional view of the invention.

The novel fire hydrant 10 and valve 12 therefor are shown in FIG. 1. Hydrant 10 is the dry barrel type, that being the type provided with a valve to drain water from the barrel when not in use. This avoids damage due to freezing of water, which could otherwise occur during periods of severe cold. Components 14 of hydrant 10 located above ground are of conventional construction, and accordingly are illustrated in silhouette only for clarity.

Conventional drain holes 16 are formed in the barrel 18 of hydrant 10, and are normally unobstructed. When hydrant 10 is in use, valve 12 unseats from a valve seat ring 20 which is not integral with, but is stationary with respect to, barrel 18. Valve seat ring 20 includes short walls 22 projecting inwardly, forming guide grooves 24 (see FIG. 3). Valve 12 includes two ears 26 which ride in respective guide grooves 24.

A control shaft 28, anchored within barrel 18 by well known structure (not shown), is arranged vertically, and threads into valve 12. When shaft 28 is rotated, valve 12 is constrained by guide grooves 24 against rotation, and must merely ascend and descend within barrel 18.

FIG. 1 shows valve 12 in the closed position. Rotation of shaft 28 would cause valve 12 to descend, thus separating valve 12 to unseat, and causing ears 26 to cover drain holes 16. Water from the water supply flows into barrel 18, and is prevented from escaping through drain holes 16. The entire supply is thus available to fire fighters, who will have uncapped nozzles 32, for attachment of fire hoses (not shown) thereto.

Figure 2:
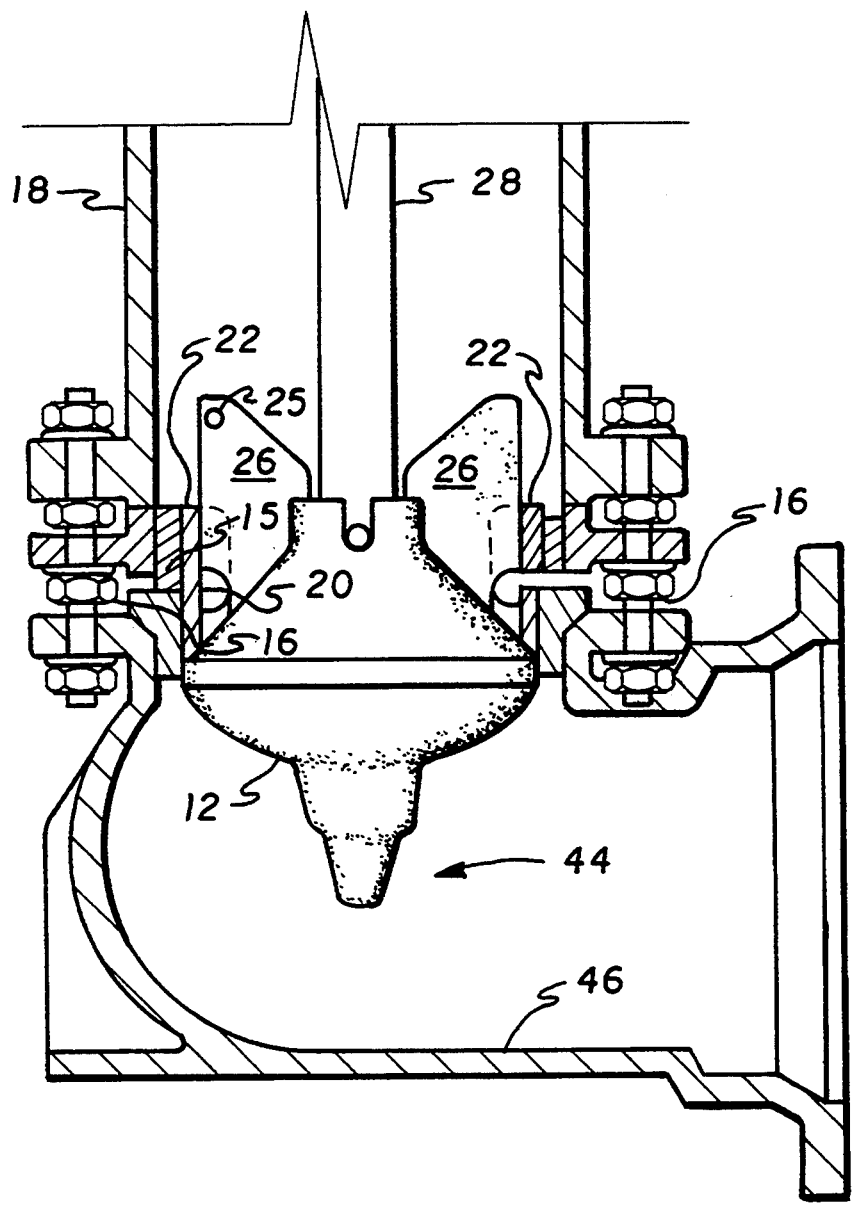
FIG. 2 is a side elevational, mainly cross sectional view of the invention, taken from the lower portion of FIG. 1 and drawn to an enlarged scale.

Now, periodically the hydrant internal components must be repaired and/or replaced, in the field of course, as a part of routine maintenance or, perhaps, emergency repair. During this operation, ordinarily the entire main valve 12 and stem 28 will have been removed, and furthermore, the valve seat ring 20 will have been unscrewed from the drain ring 15 and also removed. After any repair or replacement of parts, the components must be reassembled. However, during such reassembly, it could happen that the valve 12 might slide down and out of the ring 20 since, prior to the instant invention, there was nothing preventing unlimited sliding of the valve ears 26 down, through and out of the ring ear guides 22. The components just discussed are best seen in FIG. 2. To prevent this unintended disassembly of parts, valve body 12 with respect to its ring 20, a stop pin 25 is provided, which is inserted through and into a hole 27, formed through an upper part of a valve ear 26.

Figure 4:
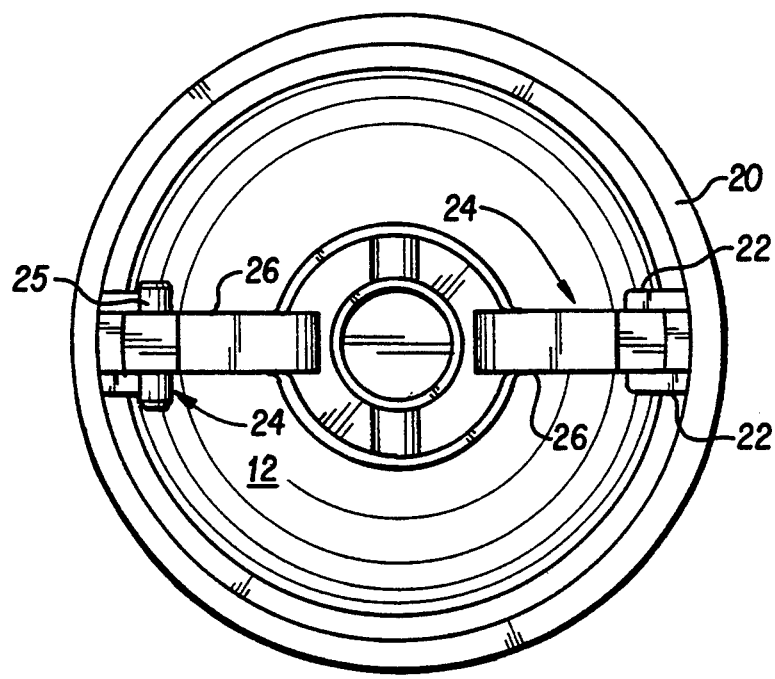
FIG. 4 is a top plan view of the novel valve body nested in the hydrant seat ring, drawn to enlarged scale.
Figures 5, 6:
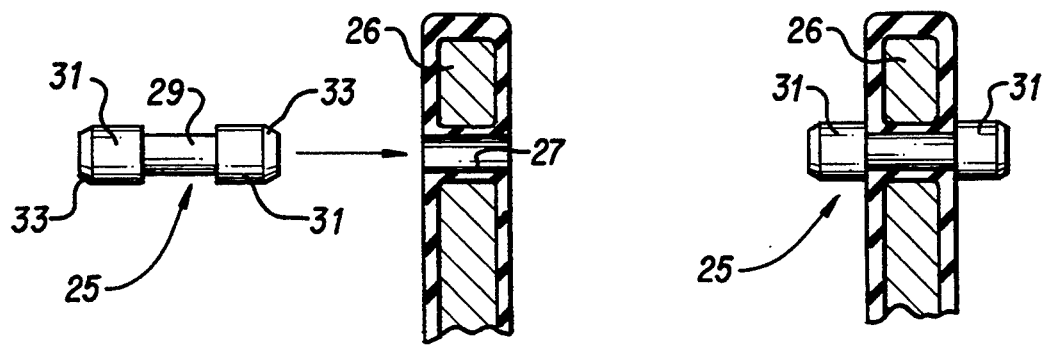
FIG. 5 is an enlarged scale, exploded, side elevational view of a stop pin and its mounting hole formed through a valve body ear.
FIG. 6 is a view similar to FIG. 5 and showing the stop pin assembled with the valve body ear.

The assembly of pin 25 with an ear 26 is uncomplicated. With reference to FIGS. 5 and 6, pin 25 includes a reduced diameter central portion 29 and two heads 31,31, which may be chamfered or shouldered, as shown at 33. The hole 27 formed through an ear 26 is lined with the same resilient material (e.g., rubber) as that encasing the entire main valve body, as is further explained hereinbelow. Assembly of pin with ear 26 is accomplished very easily, by simply pushing the pin 25 into the hole 27 until it is firmly seated therein, as seen in FIG. 6. Now, with reference to FIGS. 2 and 4, it is readily appreciated that when the valve body with valve seat ring 20 is reinserted into barrel 18, after maintenance is performed, valve body 12 is prevented from sliding beyond its seat ring 20 because the pin 25 will stop against lugs 22 of ring 20 and thus prevent ears 26 of valve 12 from passing all the way through the lugs 22.

Although but one stop pin 25 is shown, obviously the other ear 26 may be similarly constructed, if desired.

Figure 3:
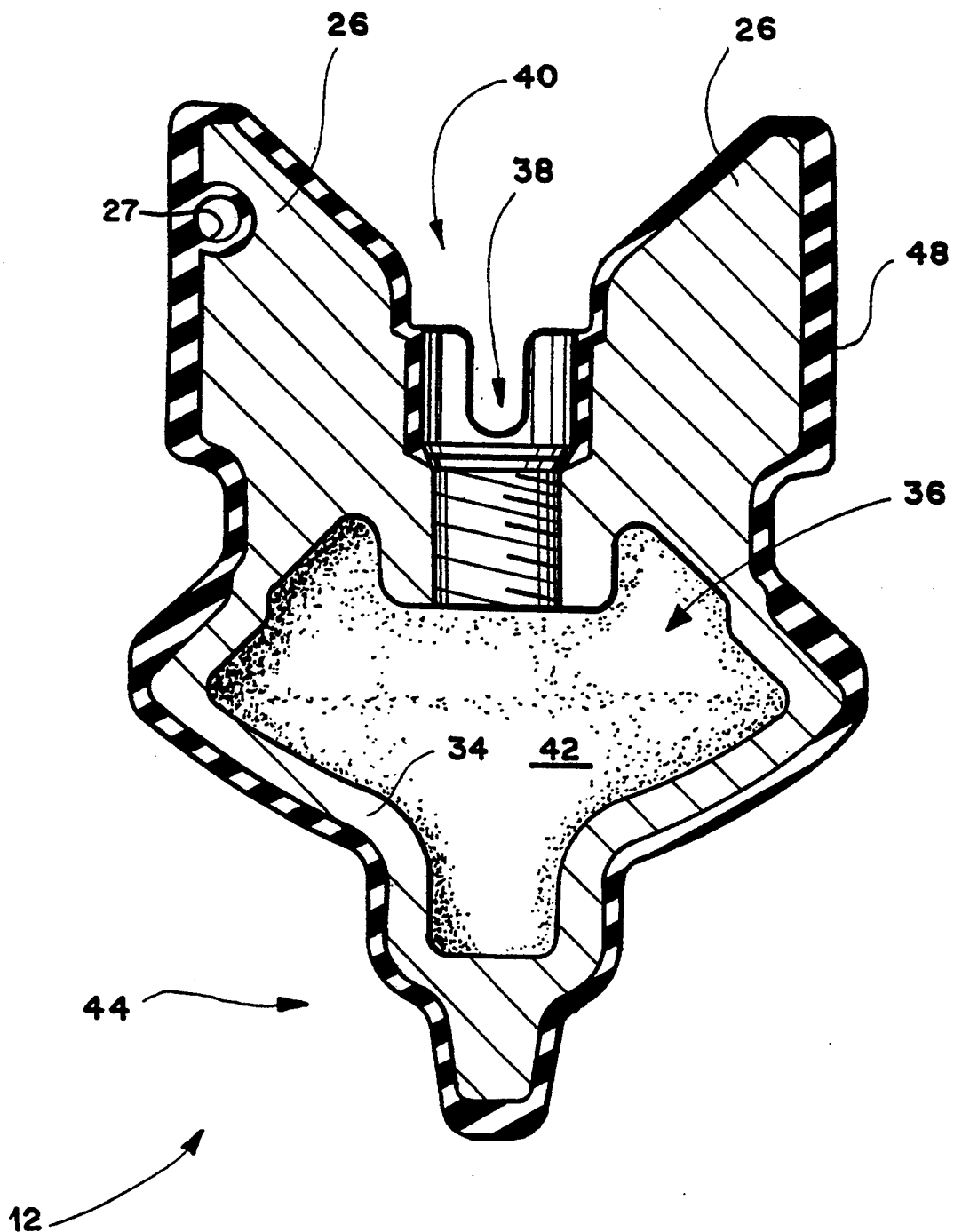
FIG. 3 is a partly cross sectional, partly side elevational detail view of the novel valve body and stop pin mounting hole, drawn to enlarged scale.

Construction of valve 12 is shown in further detail in FIG. 3. The overall configuration of a base member 34 may be variously described as generally spherical or as comprising generally frustoconical members abutting so that the small ends thereof face away from one another. Regardless of the actual shape, sharp edges are avoided, and the diameter of base member 34 gradually increases, starting at the top and bottom, and proceeding toward the middle. These characteristics will be referred to as "tapered" hereinafter for brevity.

Base member 34 is preferably made in a single piece from cast iron, which is strong, durable over long periods of time, readily molded into a preferred configuration, and accepts threading. Base member 34 includes a hollow center 36, which is sealed when shaft 28 (see FIG. 1) is threaded into a threaded hole 38 which is formed in the top center 40 thereof. The unprotected interior surfaces 42 of base member 34 are therefore protected against corrosion by contact with water.

Base member 34 includes ears 26 and a downwardly facing projection 44. Projection 44 is solid, in that unlike base member 34, it is not hollow. Ears 26 serve as valves closing drain holes 16 (see FIG. 1), and their relation to guide grooves 24 is best seen in FIG. 3. Again referring to FIG. 2, projection 44 limits downward travel of valve 12 by contact with the floor 46 (see FIG. 1) of hydrant 10. Base member 34 is covered by a thick coat 48 of rubber.

The novel valve and hydrant improved thereby thus enjoy reduced effort of handling during transport, construction, and servicing, while enjoying an extended service life and maintained head pressure during operation, all due to the combination of features presented herein.

It is to be understood that the present invention is not limited to the sole embodiment described above, but encompasses any and all embodiments within the scope of the following claims.

I claim:

1. A valve body for a dry barrel fire hydrant, comprising:
a rigid single piece base member having a coating of resilient surface material, a top, a bottom, an empty cavity therein, and a threaded countersunk central opening in said top of said base member, the countersunk portion of said opening being surrounded by a resilient surface coating, whereby said empty cavity is closed from communication with water flowing therearound;
said base member further having a tapered configuration and at least one upwardly orientated ear extending from said top; and a solid, downwardly facing projection extending from said bottom of said base member; and
stop pin means mounted in said at least one ear for cooperating with the valve seat ring of a hydrant assembly and preventing disassembly of said valve downwardly through the hydrant valve seat ring.

2. A fire hydrant comprising:
a barrel including means defining at least one drain hole therein, interior walls forming at least one guide groove therein, and a valve seat member having a valve seat; and
a valve assembly including a control shaft secured within said barrel, and a valve body attached to said control shaft, said valve body movable selectively into and out of contact with said valve seat, said valve comprising a single piece base member made from a rigid material and defining an empty cavity therein, and having means defining an upwardly facing countersunk threaded hole, said base member having a tapered configuration and at least one upwardly orientated ear positioned around the upwardly facing hole and having an outward edge alignable with said at least one drain hole when said valve is opened, there being one said ear for each drain hole, said at least one ear being partially surrounded by said guide groove, and constrained to travel vertically thereby, said base member further including an external coating of resilient material, said valve body further including a downwardly facing projection and a resilient coating covering the exterior of said valve body including the countersunk portion of said hole;
said valve seat including a valve seat ring, said guide groove being a part of said valve seat ring; and
stop pin means mounted in said at least one ear for cooperating with said valve seat ring guide groove of said hydrant assembly and preventing disassembly of said valve downwardly through said hydrant valve seat ring by abutment of said stop pin means against said valve seat ring guide groove.

3. A hydrant valve comprising:
a tapered base member of unitary construction having a first, lower end and a second, upper end, and including a plurality of guide ears protruding from said second end;
a resilient coating covering the exterior of said base member; and
stop pin means mounted in at least one of said guide ears for cooperating with the valve seat ring of a hydrant assembly and preventing disassembly of said valve downwardly through the hydrant valve seat ring.

4. The hydrant valve according to claim 3, wherein said plurality of guide ears includes a first ear and a second ear positioned on a side of said second end opposite to said first ear, said stop pin means being mounted in and through one of said ears near an upper end thereof.

5. The hydrant valve according to claim 4, wherein said plurality of guide ears includes three ears protruding from said second end.

6. The hydrant valve according to claim 5, wherein said base member has a maximum circumference, and said guide ears do not extend beyond said maximum circumference.

* * * * *